United States Patent
Ye et al.

(10) Patent No.: US 7,876,846 B2
(45) Date of Patent: Jan. 25, 2011

(54) METHOD OF QAM SOFT DEMAPPING

(75) Inventors: Hua Ye, Durham, NC (US); Daniel Iancu, Pleasantville, NY (US)

(73) Assignee: Aspen Acquisition Corporation, San Diego, CA (US)

( * ) Notice: Subject to any disclaimer, the term of this patent is extended or adjusted under 35 U.S.C. 154(b) by 932 days.

(21) Appl. No.: 11/692,599

(22) Filed: Mar. 28, 2007

(65) Prior Publication Data

US 2008/0239940 A1     Oct. 2, 2008

(51) Int. Cl.
*H04L 5/12* (2006.01)
(52) U.S. Cl. .................. 375/261; 375/262; 375/340; 375/341; 714/759; 714/760; 714/794; 714/795
(58) Field of Classification Search .......... 375/261, 375/262, 340, 341; 714/759, 760, 794, 795
See application file for complete search history.

(56) References Cited

U.S. PATENT DOCUMENTS

| 6,687,315 | B2 | 2/2004 | Keevill et al. | |
|---|---|---|---|---|
| 2004/0174848 | A1* | 9/2004 | Takayama et al. | 370/335 |
| 2007/0165729 | A1* | 7/2007 | Ha et al. | 375/260 |
| 2007/0258531 | A1* | 11/2007 | Chen et al. | 375/261 |

FOREIGN PATENT DOCUMENTS

| WO | WO 03/058904 | 7/2003 |
|---|---|---|
| WO | WO 2005/013543 | 2/2005 |
| WO | WO 2007/092744 | 8/2007 |

OTHER PUBLICATIONS

Etsien 300 744 v1.4.1. (Jan. 2001), "Digital Video Broadcasting (DVB): Framing Structures, Channel Coding, and Modulation for Digital Terrestrial Televsion."
"Digital Video Braodcasting (DVB); Transmission Systems for Handheld Terminals (DVB-H)," ETSI EN 302 304 V 1.1.1 (Nov. 2004).
Daniel Iancu et al., "On the Performance of Multiple OFDM Receivers for DVB," Mobile Future, 2004 and the Symposium on Trends in Communications. SympoTIC '04.

* cited by examiner

*Primary Examiner*—Chieh M Fan
*Assistant Examiner*—Siu M Lee
(74) *Attorney, Agent, or Firm*—Knobbe Martens Olson & Bear LLP

(57) ABSTRACT

A method of demapping in a receiver including deriving M intermediate soft bit values $y_j$ for the I and Q data of the input signal as a function of the spacing in the constellation; and limiting the range of the M values $y_j$. A look-up table index is derived for each of the limited M values $y_j$. A look-up table, having $2^{N+1}$ entries for supporting up to N soft bit outputs, is indexed using the derived indices; and K soft bits for each of the M values $y_j$ of the I and Q data are outputted.

9 Claims, 3 Drawing Sheets

FIGURES 2A-C
Prior Art

METHOD OF QAM SOFT DEMAPPING

BACKGROUND AND SUMMARY OF THE DISCLOSURE

The present invention relates generally to communication receivers and, more specifically, to soft bit demapping in orthogonal frequency division multiplexing (OFDM) receivers.

The following disclosure will be described for a digital video broadcasting (DVB) receiver for digital terrestrial television (DTV). The concepts are equally applicable to any other channels of transmission of DTV receivers and to other receivers or standards using orthogonal frequency division multiplexing (OFDM). These may include but not be limited to wireless standards worldwide, such as wireless LAN 802.11a and g, HIPERLAN/2, Digital Audio Broadcasting (DAB), Digital Video Broadcasting Terrestrial (DVB-T), Digital Video Broadcasting for handheld (DVB-H), 802.16 Broadband Wireless Access, etc. The European terrestrial DTV standard DVB-T (ETS 300 744) is based on COFDM technologies to combat multipath fading. See ETSI EN 300 744 V.1.4.1 "Digital Video Broadcasting (DVB): Framing Structures, Channel Coding, and Modulation for Digital Terrestrial Television."

FIG. 1 shows a block diagram for a typical DVBT receiver. The digital signal processing for a DVBT receiver can be partitioned into three portions. The first portion 10 includes an RF front end 12, and A/D converter 14, an OFDM demodulator 16, a demodulation 18 and a pilot and TPS decoder 19. This receiver front-end signal processing portion performs receiver training, including various synchronization and channel estimation and OFDM demodulation. The demodulation portion includes a QAM demapper. The second portion 20 is the DVBT receiver back-end signal processing block. It performs DVBT inner channel decoding using inner-deinterleaver 21 and Viterbi decoder 22 and outer channel decoding using outer-deinterleaver 24, RS decoder 26 and energy disperse removal 28. The third portion 30 is a MPEG Decoder. An example is shown in U.S. Pat. No. 7,123,669.

A DVB OFDM transmitter modulates all the data-bearing subcarriers in one OFDM symbol by either QPSK, 16-QAM, 64-QAM, non-uniform 16-QAM and 64-QAM constellations. FIGS. 2A-2C shows the QPSK, uniform 16-QAM and 64-QAM constellations, respectively. In an OFDM receiver as shown in FIG. 1, the data-bearing subcarriers will first go through channel correction, QAM demapping, inner-deinterleaving before entering the Viterbi decoder. Soft QAM demapping is able to provide Viterbi decoder with soft input bits that will enable Viterbi decoder to perform significantly better than with hard bit input. However, the complexity of soft demapping operation for higher order constellation such as 64-QAM is extremely significant. The complexity also grows proportional to the number of soft bits required by Viterbi decoder. Another example is shown in U.S. Pat. No. 6,687,315.

The present method of demapping is in a receiver wherein the input signal is a) demodulated into I real and Q imaginary data pairs which was mapped using a constellation having M bits for the I and Q data pairs, b) demapped, c) deinterleaved and d) decoded. The method of demapping includes deriving M intermediate soft bit values $y_j$ (j=0~M-1) for the I and Q data pairs as a function of the spacing in the constellation; and limiting the range of the M values $y_j$. A look-up table index is derived for each of the limited M values $y_j$. A look-up table, having $2^{N+1}$ entries for supporting up to N soft bits, is indexed using the derived indices; and K soft bits (K<=N) for each data bit of the I and Q data pairs are outputted.

The range is limited to ±1. The indices are derived by $2^K-(2^K-1)*y_j$. The look-up table includes only soft bits.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
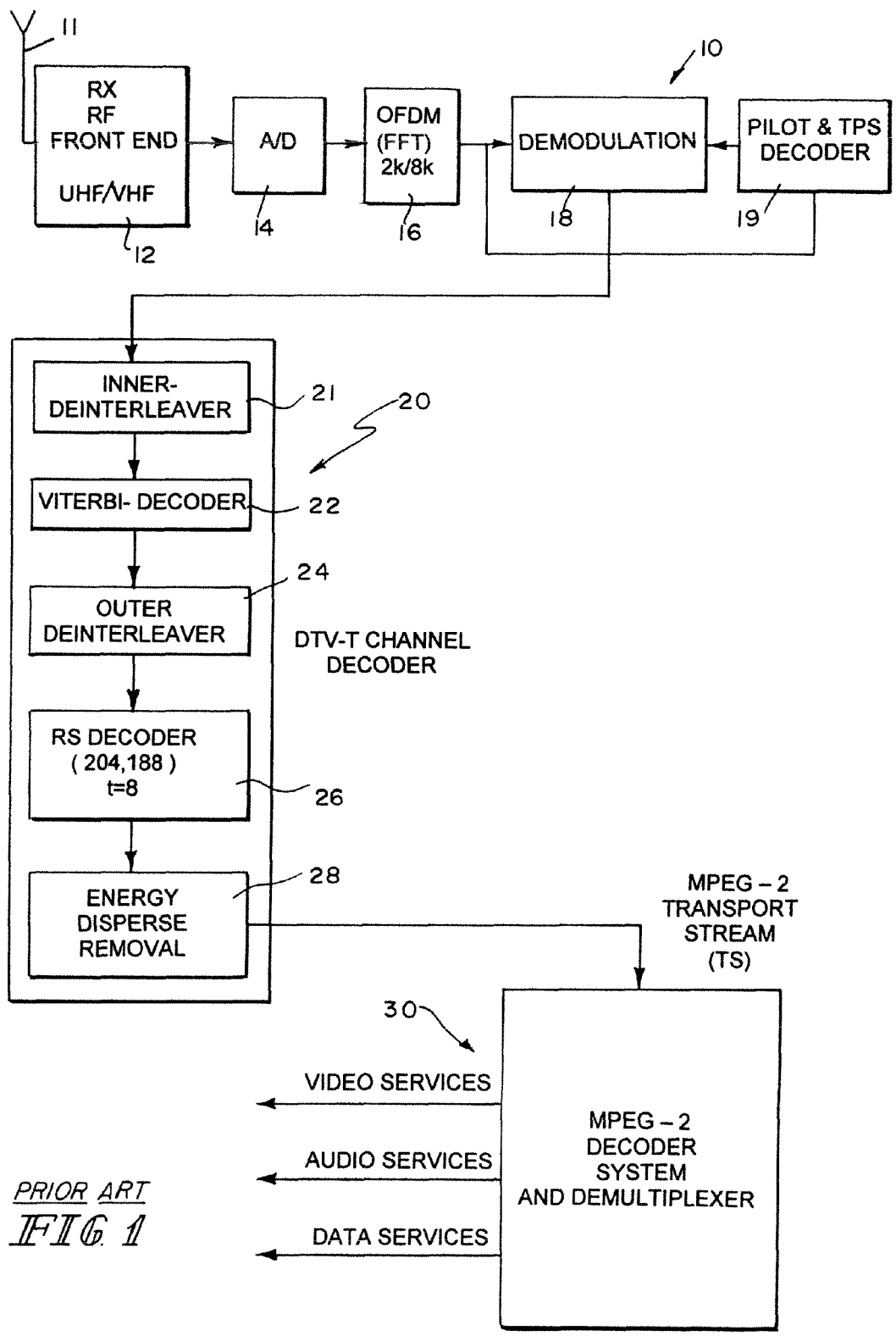
FIG. 1 is a block diagram of a digital video broadcasting terrestrial receiver, according to the prior art.
Figure 2:
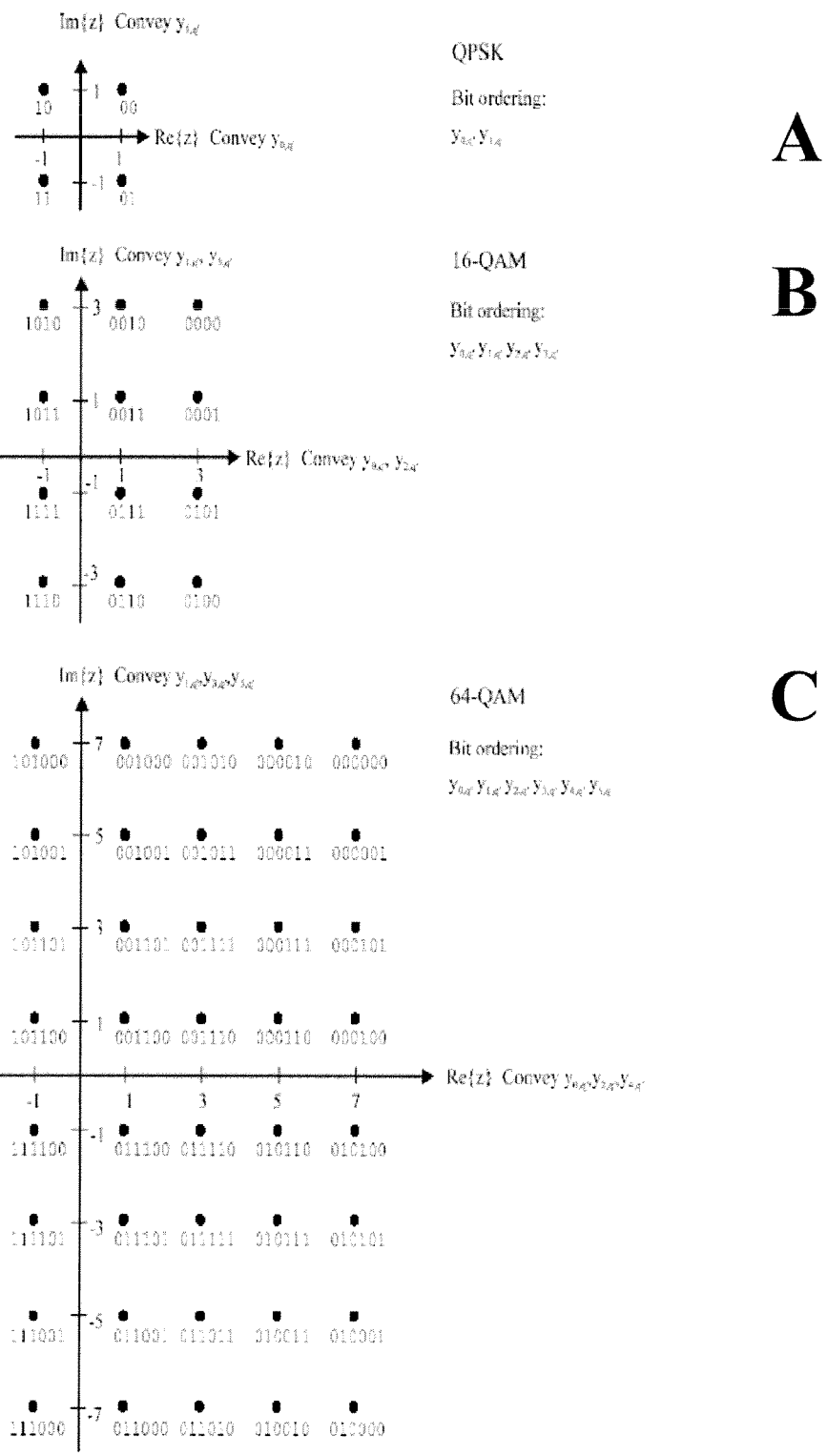
FIGS. 2A-C are diagrams of the QPSK, uniform 16-QAM and 64-QAM constellations, respectively of the prior art.

The N bit QAM soft demapping method will be described using the QPSK, uniform 16-QAM and 64-QAM constellations as shown in FIGS. 2A-C. The principles of the method should be readily applicable to other QAM constellations such as non-uniform QAM demapping.

The N bit QAM soft demapping method is performed in two steps. The first step is to transform the input complex signal into uniformly ranged intermediate soft values for each output bit. In the second step, the intermediate soft value corresponding to each bit output is used to calculate an index into a look-up table, to generate the output soft bits.

Figure 3:
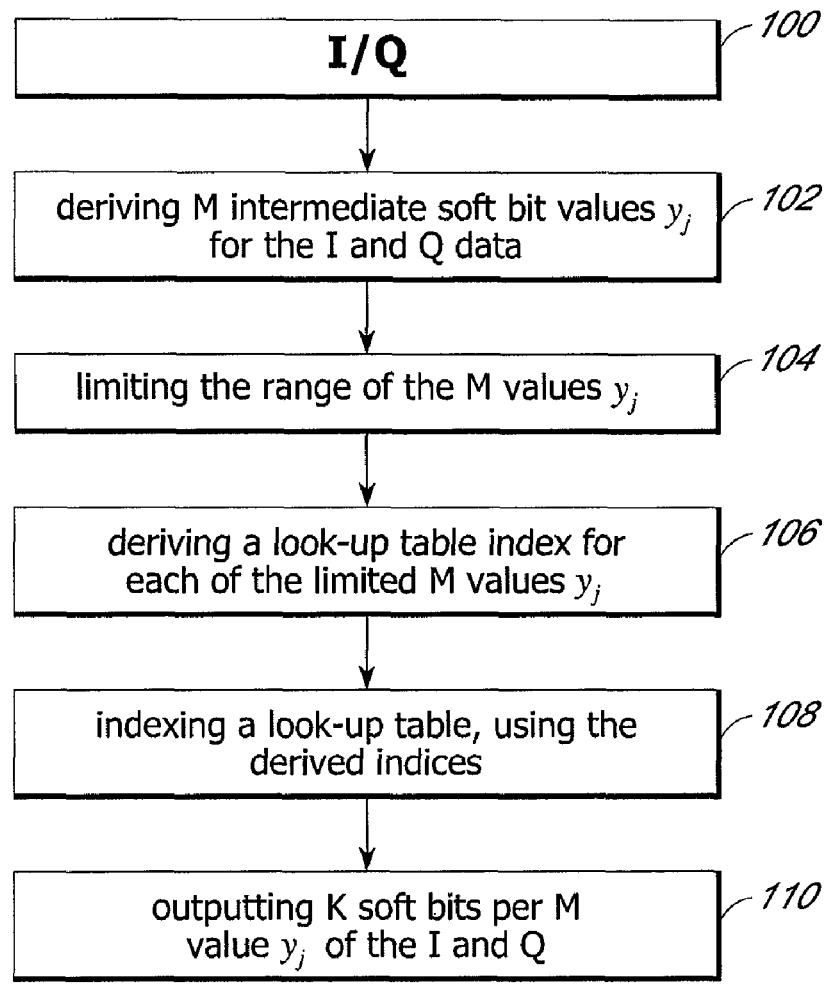
FIG. 3 is a diagram of the demapping process according to the present disclosure.

As illustrated in FIG. 3, the method of demapping includes at step 102 deriving M intermediate soft bit values $y_j$ for the I and Q data pairs as a function of the spacing in the constellation from the I/Q inputted at 100. The range of the M values $y_j$ is limited at step 104. A look-up table index is derived for each of the limited M values $y_j$ at step 106. A look-up table, having $2^{N+1}$ entries for supporting up to N soft bits is indexed using the derived indices at step 108 and K soft bits (K<=N) for each of the M bits the I and Q data pairs are outputted at step 110.

The step 102 of deriving M intermediate soft bit values $y_j$ for the I and Q data pairs for the constellations shown in FIGS. 2A-C are, as follows, where the input complex signal is $z_i + iz_q$:

1. QPSK Constellation carrying 2 data bits (M=2) (FIG. 2A):

$$y_{0,q'} = z_i$$

$$y_{1,q'} = z_q$$

2. 16-QAM Constellation carrying 4 data bits (M=4) (FIG. 2B):

$$y_{0,q'} = z_i$$

$$y_{1,q'} = z_q$$

$$y_{2,q'} = abs(z_i) - 2$$

$$y_{3,q'} = abs(z_q) - 2$$

3. 64-QAM Constellation carrying 6 data bits (M=6) (FIG. 2C):

$$y_{0,q'} = z_i$$

$$y_{1,q'} = z_q$$

$y_{2,q'} = \text{abs}(z_i) - 4$ $y_{3,q'} = \text{abs}(z_q) - 4$ $y_{4,q'} = 2 - \text{abs}(z_i)$, if $\text{abs}(z_i) < 4\text{abs}(z_i) - 6$, else $y_{5,q'} = 2 - \text{abs}(z_q)$, if $\text{abs}(z_q) < 4\text{abs}(z_q) - 6$, else At the end of the first step 102, the intermediate soft values $y_j$ are limited to within ±1 range at step 104. In step 106, the intermediate soft values within ±1 range are used to generate or derive an index into a lookup table to get the final demapped soft bits output by steps 108, 110.

The following is a table that will support soft bit demapping up to 4 soft bits:

QuanTbl[32]={0, 0, 1, 1, 2, 2, 3, 3, 4, 4, 5, 5, 6, 6, 7, 7, 8, 8, 9, 9, 10, 10, 11, 11, 12, 12, 13, 13, 14, 14, 15, 15};

Generally speaking, to support up to N soft bit demapping, the above demapper table will need to be of size $2^{N+1}$. The following operation shows how the lookup table index is generated in step 106:

$4 - 3 * y_{i,q'}$, i=0, 1, 2, 3, 4, 5, with 2 soft bits per data bit
$8 - 7 * y_{i,q'}$, i=0, 1, 2, 3, 4, 5, with 3 soft bits per data bit
$16 - 15 * y_{i,q'}$, i=0, 1, 2, 3, 4, 5, with 4 soft bits per data bit
...
$2^K - (2^K - 1) * y_{i,q'}$, i=0, 1, 2, 3, 4, 5, with K soft bits per data bit
$2^N - (2^N - 1) * y_{i,q'}$, i=0, 1, 2, 3, 4, 5, with N soft bits per data bit Since the intermediate soft values $y_j$ are limited to within ±1, the table indices for a) K=2 soft bits per data bit are 1 to 7 which correspond to soft bits 0 to 3, b) K=3 soft bits per data bit are 1 to 15 which correspond to soft bits 0 to 7, and c) K=4 soft bits per data bit are 1 to 31 which correspond to soft bits 0 to 15.

The following 2 soft bit per data bit demapping is an example of the elements in the lookup table:

| | | | y: | | | |
|---|---|---|---|---|---|---|
| −1 | −⅔ | −⅓ | 0 | ⅓ | ⅔ | 1 |
| soft bit: 3 | 3 | 2 | 2 | 1 | 1 | 0 |

First y is limited to within ±1. Since it's K=2 soft bit demapping, when
y=−1, the soft bit output will be 3
y=−⅓, the soft bit output will be 2
y=⅓, the soft bit output will be 1
y=1, the soft bit output will be 0

The decision boundaries are y=−⅔, 0, and ⅔, when y is on the boundary, the soft bit output is chosen to be the following values:
y=−⅔→soft bit=3
y=0→soft bit=2
y=⅔→soft bit=1

The resulting 7 locations are:

| y | index | soft bit |
|---|---|---|
| 1 | 1 | 0 |
| ⅔ | 2 | 1 |
| ⅓ | 3 | 1 |
| 0 | 4 | 2 |
| −⅓ | 5 | 2 |
| −⅔ | 6 | 3 |
| −1 | 7 | 3 |

In the present method, each data bit is processed independently, namely for each input I/Q signal, the demapped soft bit output will be M=6 outputs for a 64-QAM constellation, for example. The individual soft bits are available prior to the deinterleaver 21. Thus, the deinterleaver will be the same for N soft bit demapping, be it N=1 for hard demapping or N=K for K soft bit per data bit demapping, since the index is set only to access the bits need for N soft bits.

Although the present disclosure has been described and illustrated in detail, it is to be clearly understood that this is done by way of illustration and example only and is not to be taken by way of limitation. The scope of the present disclosure is to be limited only by the terms of the appended claims.

REFERENCES

[1] ETSI EN 300 744 V.1.4.1 "Digital Video Broadcasting (DVB): Framing Structures, Channel Coding, and Modulation for Digital Terrestrial Television."
[2] "Transmission Systems for Handheld Terminals (DVB-H)," Draft DVB-H standard, DVB document A081, June 2004
[3] "On the Performance of Multiple OFDM Receivers for DVB," Sandbridge Technologies, Inc., Sypotic04.

What is claimed is:

1. A method of demapping in a receiver wherein the input signal is a) demodulated into I real and Q imaginary data pairs which was mapped using a constellation having M data bits for the I and Q pairs, b) demapped, c) deinterleaved and d) decoded, the method of demapping comprising:
deriving M intermediate soft bit values $y_j$ for the I and Q data pairs as a function of the spacing in the constellation;
limiting the range of the M values $y_j$;
deriving a look-up table index for each of the limited M values $y_j$;
indexing a look-up table, having $2^{N+1}$ entries for supporting up to N soft bits, for each M data bit using the derived indices; and
outputting K soft bits for each data bit of the I and Q data pairs where K<=N wherein the range is limited to ±1 and the indices are derived by $2^K - (2^K - 1) * y_j$.

2. The method according to claim 1, wherein the indices are the locations and the boundaries of the points of the constellation.

3. The method according to claim 1, wherein the indices are the locations and the boundaries of the points of the constellation.

4. The method according to claim 1, wherein the look-up table includes only soft bits.

5. The method according to claim 1, wherein for M equal to 2 (QPSK), the intermediate soft bits ($y_{0,q'}$, $y_{1,q'}$) of the input signal ($Z_i + iZ_q$) equal to:

$y_{0,q'} = Z_i, y_{1,q'} = Z_q$.

6. The method according to claim 1, wherein for M equal to 4 (16-QAM), the intermediate soft bits ($y_{0,q'}$, $y_{1,q'}$, $y_{2,q'}$, $y_{3,q'}$) of the input signal ($Z_i + iZ_q$) equal to:

$y_{0,q'} = Z_i, y_{1,q'} = Z_q, y_{2,q'} = |Z_i| - 2, y_{3,q'} = |Z_q| - 2$.

7. The method according to claim 1, wherein for M equal to 6 (64-QAM), the intermediate soft bits ($y_{0,q'}$, $y_{1,q'}$, $y_{2,q'}$, $y_{3,q'}$, $y_{4,q'}$, $y_{5,q'}$) of the input signal ($Z_i + iZ_q$) equal to:

$$y_{0,q'} = Z_i \quad y_{1,q'} = Z_q \quad y_{2,q'} = |Z_i| - 4 \quad y_{3,q'} = |Z_q| - 4$$

if $|Z_i| < 4$, $y_{4,q'} = 2 - |Z_i|$, else $y_{4,q'} = |Z_i| - 6$ and
if $|Z_q| < 4$, $y_{5,q'} = 2 - |Z_q|$, else $y_{5,q'} = |Z_q| - 6$.

8. A receiver including a) demodulator for demodulating an input signal into I real and Q imaginary data pairs which was mapped using a constellation having M bits for the I and Q pairs, b) a demapper with a look-up table, c) deinterleaver and d) decoder; and the demapper:

derives M intermediate soft bit values $y_j$ for the I and Q data pairs as a function of the spacing in the constellation;

limits the range of the M values $y_j$;

derives a look-up table index for each of the limited M values $y_j$;

indexes the look-up table, having $2^{N+1}$ entries for supporting up to N soft bits using the derived indices; and outputs K soft bits per M data bit of the I and Q data pairs where K<=N, wherein the range is limited to ±1 and the indices are derived by $2^K - (2^K - 1) * y_j$.

9. The method according to claim 8, wherein the look-up table includes only soft bits.

* * * * *